Patented Feb. 26, 1952

2,587,540

UNITED STATES PATENT OFFICE 2,587,540

METHOD FOR THE PREPARATION OF ALPHA-BETA UNSATURATED KETONES AND ARALKYL CARBOXYLIC ACIDS

Forrest W. Shaver, Akron, Ohio, assignor to The B. F. Goodrich Company, New York, N. Y., a corporation of New York No Drawing. Application March 22, 1950, Serial No. 151,300

8 Claims. (Cl. 260—515)

1

This invention relates to a method for the preparation of aralkyl carboxylic acids and alpha-beta unsaturated ketones, and pertains more particularly to the preparation of such compounds by a Friedel-Crafts reaction of aromatic hydrocarbons and substituted aromatic hydrocarbons with beta-lactones.

It is disclosed in U. S. Patent 2,356,459 to Frederick E. Küng that beta-lactones, that is, lactones or inner esters of beta-hydroxy carboxylic acids may be obtained in good yields by the reaction of a ketene with an aldehyde or ketone. In this manner beta-propiolactone (also called hydracrylic acid lactone) which has the structure

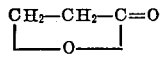

is economically obtained from ketene and formaldehyde. The ease with which beta-lactones are now obtained makes it desirable to use these compounds as starting materials in the synthesis of may valuable compounds, including aralkyl carboxylic acids and alpha-beta unsaturated ketones, all of which are quite useful as chemical intermediates in the preparation of medicinal compounds and for various other purposes.

I have now discovered that saturated aliphatic beta-lactones readily undergo a Friedel-Crafts type reaction with aromatic hydrocarbons and halogen or alkoxy substituted aromatic hydrocarbons in the presence of a Friedel-Crafts type catalyst such as aluminum chloride to give in good yields both an aralkyl carboxylic acid and an alpha-beta unsaturated ketone. In addition to these two products a small quantity of a beta-chloro aliphatic carboxylic acid is also obtained.

The reaction of this invention is believed to proceed substantially according to the following equation:

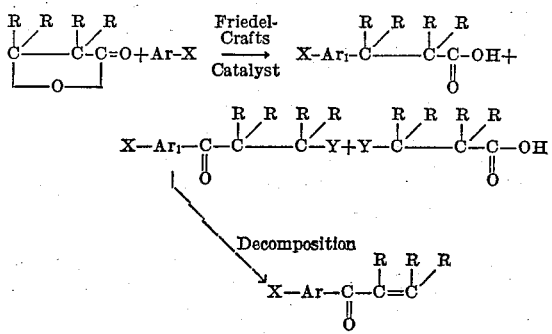

2 wherein Ar is an aryl radical, Ar₁ is an arylene radical, X is a member of the class consisting of hydrogen, alkoxy radicals and halogen atoms, Y is a halogen atom and each R is a member of the class consisting of hydrogen and lower alkyl radicals. As shown in the reaction equation the alpha-beta unsaturated ketone is formed from an intermediate compound, a ketone possessing the structure

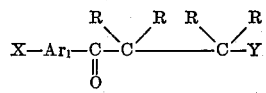

which is relatively unstable and decomposes readily to give the alpha-beta unsaturated ketone. The fact that the intermediate ketone is formed in the reaction is substantiated by the fact that an amino ketone is formed when aniline is added to the reaction mixture obtained when the reaction depicted above is carried out.

The beta-lactones which are reacted with aryl compounds in accordance with this invention are saturated aliphatic beta-lactones which possess the structure

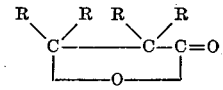

wherein each R is a member of the class consisting of hydrogen and lower alkyl radicals, preferably containing from 1 to 4 carbon atoms. Typical examples of such beta-lactones include in addition to beta-propiolactone, beta-butyrolactone, beta-isobutyrolactone, beta-n-valerolactone, beta-isovalerolactone, beta-isopropyl-beta-propiolactone, beta-ethyl-beta-butyrolactone, alpha-methyl-beta-propiolactone, alpha, alpha-dimethyl-beta-propiolactone, alpha, beta-dimethyl-beta-propiolactone, and the like. Especially preferred beta-lactones for use in this process are beta-propiolactone and other beta-lactones which are water-soluble; beta-lactones containing from 3 to 6 carbon atoms possess this property.

As shown in the reaction equation hereinabove, the aryl compound utilized in the reaction possesses the structure Ar—X, wherein Ar is an aryl radical and X is a member of the class consisting of hydrogen, halogen, and alkoxy radicals. Included within this class of compounds are aromatic hydrocarbon compounds such as benzene, o, m and p toluenes, ethylbenzene, n-propylbenzene, isopropylbenzene (cumene), tert.-butylbenzene, n-octylbenzene, isooctylbenzene, n-laurylbenzene, o, m and p xylenes, m-methylethylbenzene, 1 - methyl - 2 - propylbenzene, 1-methyl-3-propylbenzene, 1-methyl-4-isopropylbenzene (p-cymene), tert.-butyltoluene, p-tert. butyltoluene, p-diethylbenzene, 1,3,5-trimethylbenzene (mesitylene), 1,2,4-trimethylbenzene (pseudocumene), 1,4-dimethyl-2-ethylbenzene, tert.-butyl-m-xylene, 1,3-dimethyl-5-tert.-butylbenzene, sym.-triethylbenzene, 1,2,3,5 - tetramethylbenzene (durene), 1,2,3,5-tetramethylbenzene (isodurene), 1,2,3,4-tetramethylbenzene (prehnitene), ethyl mesitylene, pentamethylbenzene, 1,3,5-trimethyl-2,4-diethylbenzene, pentaethylbenzene, amylbenzene, benzylbenzene, 1 - methylnaphthalene, 2 - methylnaphthalene, 1-ethylnaphthalene, 2-ethylnaphthalene, 1,4-dimethylnaphthalene, 2,3-dimethylnaphthalene, 1-phenylnaphthalene, 1-propylnaphthalene, 2-amylnaphthalene, diamylnaphthalene, di-tert.-butylnaphthalene, 4 - isopropyl - 1,6 - dimethylnaphthalene, 7-isopropyl-1-methyl-naphthalene, 2,3,6,7-tetramethylnaphthalene, o, p'-bitolyl, biphenyl, p-terphenyl, and the like, with benzene and lower alkyl substituted benzenes being especially preferred;

Halogenated aryl compounds such as chlorobenzene, 1-chloro-4-fluorobenzene, 1-chloro-4-iodobenzene, 1,2-dichlorobenzene, 1,3-dichlorobenzene, 1,4-dichlorobenzene, 1,2,3,4-tetrachlorobenzene, pentachlorobenzene, bromobenzene, 1-bromo-3-chlorobenzene, 1-bromo - 4 - chlorobenzene, 1-bromo-4-fluorobenzene, 1-bromo-2-iodobenzene, 1-bromo-4-iodobenzene, 1,3-dibromobenzene, 1,2,4,5-tetrabromobenzene, penta-bromobenzene, iodobenzene, pentaiodobenzene, 1,2,3,4-tetraiodobenzene, fluorobenzene, o, m and p-chlorotoluenes, o, m and p-bromotoluenes, o, m and p-fluorotoluenes, o, m and p-iodotoluenes, 2-bromonaphthalene, 1-chloronaphthalene, 2,3-dichloronaphthalene, 1,5 - dichloronaphthalene, 1,8-dichloronaphthalene, 1 - fluoronaphthalene, 2-iodonaphthalene and the like, mono-halogenated benzenes being preferred members of this class;

Alkoxy substituted aryl compounds such as methoxybenzene, ethoxybenzene, propoxybenzene, butoxybenzene, pentoxybenzene, isopropoxybenzene, isobutoxybenzene, o, m and p-methoxytoluenes, o, m and p-ethoxytoluenes, o, m and p-propoxytoluenes, methoxynaphthalene, propoxynaphthalene, isopropoxynaphthalene, ethoxynaphthalene, and the like, the preferred compounds being those in which the alkoxy radical contains from 1 to 4 carbon atoms.

Any of the Friedel-Crafts type catalysts may be used to catalyze the reaction of this invention. Included within this class of catalysts are metallic halides such as aluminum chloride, aluminum fluoride, antimony chloride, antimony fluoride, beryllium chloride, beryllium fluoride, zinc fluoride or mixtures of such metallic halides, organic fluorides, acyl halide complexes, organic metallic halides such as trimethyl aluminum chloride, and complex double compounds of aluminum halides with hydrogen halides, for example, such as the complex formed by fusing aluminum chloride with antimony chloride and treating the resulting mixture with hydrogen chloride. The quantity of the Friedel-Crafts catalyst employed is not critical, but in general it may be stated that it is desirable to use from 1 to 5 moles of catalyst for each mole of the beta-lactone, with the optimum ratio being about 2 moles of catalyst for each mole of the beta-lactone.

In carrying out the reaction, one preferred method consists in first admixing the aryl compound and the Friedel-Crafts catalyst, maintaining this mixture at a relatively low temperature, for example, below about 10° C. and then adding the beta-lactone slowly and with constant stirring. If desired, the reaction may be carried out in an inert solvent for the reactants, for example, such as halogenated aliphatic hydrocarbons, nitrobenzene and the like. After the addition of the beta-lactone is complete the reaction mixture is preferably heated for a short time in order to insure completion of the reaction. However, it is to be understood that cooling of the aryl compound-catalyst mixture before addition of the beta-lactone and subsequent heating of the reaction mixture are not critical expedients, but are merely desirable expedients which facilitate the carrying out of the reaction.

The desired products may be recovered from the reaction mixture in the conventional manners utilized with Friedel-Crafts type reactions. For example, the products may be separated by first decomposing the Friedel-Crafts mixture with water and a strong acid such as hydrochloric acid whereupon a water layer and a water-insoluble aryl compound layer are formed, the water layer containing the beta-halo carboxylic acid and the aryl compound layer containing the unsaturated ketone, the aralkyl carboxylic acid and a minor portion of the beta-halo carboxylic acid. The decomposition mixture may be distilled at this point to give the desired products. Preferably, however, the layers are separated and the water layer is extracted with benzene or similar material to remove the beta-halocarboxylic acid present therein. This extracted material is combined with the layer of aryl compound containing the ketone and the aralkyl carboxylic acid. This combined material may then be distilled to give the desired products. More desirably, however, the combined material is extracted with alkali to give two layers, the aryl compound layer containing the unsaturated ketone and the basic water layer containing the beta-halocarboxylic acid and the aralkyl carboxylic acid in the form of their alkali salts. The unsaturated ketone is recovered by distillation of the aryl compound layer, preferably at reduced pressure. The basic layer is then acidified and extracted with a suitable solvent such as an organic hydrocarbon. Upon distillation of the extracted material, the aralkyl carboxylic acid and the beta-halocarboxylic acid are separated. Because the alpha-beta unsaturated ketone tends to polymerize to give a high boiling residue during its separation by distillation, the actual yield is much higher than that indicated by the isolated material.

The following examples will illustrate the practice of the invention, but it is not intended to limit the invention thereto, for numerous modifications in the particular compounds and conditions employed will be obvious to those skilled in the art. In the examples all parts are by weight unless otherwise indicated:

*Example I*

439.5 parts of benzene and 293 parts (2.2 moles) of aluminum chloride are placed in a reactor equipped with a mechanical stirrer and temperature measuring means. The mixture thus formed is cooled to from 6° to 9° C. and 72 parts (1 mole) of beta-propiolactone are slowly added over a period of about 4 hours. The reactor is then connected to a water condenser and the reaction mixture heated at 60° to 70° C. for 4 hours. The mixture is then cooled and decomposed in 500 parts of ice and 125 parts concentrated hydrochloric acid. The benzene layer is separated from the water layer and is extracted with 10% sodium hydroxide solution until the washings are basic. The benzene layer which contains the alkali insoluble material is dried over sodium sulfate and distilled at reduced pressure. 20 parts (15.2%) of vinyl phenyl ketone are obtained. The vinyl phenyl ketone is identified as its 1,3-diphenyl pyrazoline, which is prepared by adding 3 parts of vinyl phenyl ketone to 3 parts of phenyl hydrazine in 8 parts of ethanol to which a catalytic quantity of glacial acid is added. The materials react at once and a yellow precipitate is formed. The solid has a melting point of 156° to 158° C. (Literature value 158° C.)

The alkaline solution obtained above is acidified with 88 parts of concentrated hydrochloric acid. The oil which separates is extracted from the water with benzene and is distilled at reduced pressure. 2.3 parts of beta-chloropropionic acid (M. P. 40°-42° C.; B. P. 60° C./1 mm.) and 93 parts (62%) of hydrocinnamic acid (M. P. 46°-48° C., 99°-101° C./1 mm.) are obtained.

*Examples II to XII*

In each of the following examples beta-propiolactone is reacted with either an aryl hydrocarbon, a halogen substituted aryl hydrocarbon or an alkoxy substituted aryl hydrocarbon in the presence of aluminum chloride, the reaction being carried out substantially according to the method of Example I except for the variations noted in the table below wherein the pertinent data is recorded.

Moreover, when the above examples are repeated utilizing other of the aryl hydrocarbons, halogen substituted aryl hydrocarbons, or alkoxy substituted aryl hydrocarbons disclosed hereinabove, or substituting other saturated aliphatic beta-lactones for beta-propiolactone, the yields of alpha-beta unsaturated ketone and aralkyl carboxylic acid obtained are in general equivalent to the yields obtained in the examples. Also when other Friedel-Crafts catalysts, such as beryllium chloride or an organic chloride-antimony chloride complex, are substituted for aluminum chloride, the reaction proceeds quite readily to form the desired products in good yield.

Although the invention has been described with reference to specific examples, it is not intended to limit the invention solely thereto, for numerous modifications and variations will be apparent to those skilled in the art and are included within the spirit and scope of the appended claims.

I claim:

1. The method which comprises first admixing a Friedel-Crafts catalyst and a compound of the structure Ar—X wherein Ar is an aryl radical and X is a member of the class consisting of hydrogen, halogen and alkoxy radicals, maintaining the resulting mixture at a temperature below about 10° C., adding to said mixture a saturated aliphatic beta-lactone of the structure

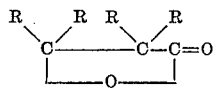

wherein each R is a member of the class consisting of hydrogen and lower alkyl radicals, in an amount such that there are present from 1 to

| Example | Moles AlCl₃ | Ar-X Compound | Moles Ar-X Compound | Moles Beta-Propio-Lactone | Temperature °C. | Hours Heated to Reflux | Per Cent Yield Vinyl Ketone | Per Cent Yield Aralkyl Carboxylic Acid |
|---|---|---|---|---|---|---|---|---|
| II | 2.2 | Benzene | 4.0 | 1.0 | 13-17 | None | 10.6 | 33.3 |
| III | 2.2 | ----do---- | 5.5 | 1.0 | 6-9 | 4 | 15.2 | 62.0 |
| IV | 1.0 | ----do---- | 13.0 | 2.0 | 5-8 | 4 | A | 20.0 |
| V | 2.2 | ----do---- | 5.0 | 1.0 | 55-60 | None | 3.5 | 21.0 |
| VI | 2.0 | Anisole | 4.6 | 1.0 | 5-10 | 6 | 21.0 | 34.0 |
| VII | 2.0 | ----do---- | 4.0 | 1.0 | 0 | None | 25.0 | 23.0 |
| VIII | 2.0 | ----do---- | 6.0 | 1.0 | 30-37 | ---do--- | 21.0 | 20.0 |
| IX ᴮ | 2.2 | 1-Chlorobenzene | 1.0 | 1.0 | 34-35 | ---do--- | 20.7 | C |
| X ᴮ | 2.2 | ----do---- | 1.0 | 1.0 | 40-50 | 2 | 9.0 | C |
| XI | 2.2 | Toluene | 3.8 | 1.0 | 17-21 | None | 11.2 | 30.8 |

A—Neutral fraction not distilled.
B—Tetrachloroethane used as a solvent.
C—Not determined.

*Example XII*

Example I is repeated except that naphthalene is substituted for the benzene. From the reaction mixture vinyl naphthyl ketone and beta-naphthylpropionic acid are obtained in appreciable yield.

*Example XIII*

Example I is repeated substituting beta-butyrolactone for beta-propiolactone and antimony chloride for aluminum chloride. The reaction mixture is then decomposed in hydrochloric acid and water and the decomposition mixture distilled at reduced pressure. Beta-methyl-beta-phenyl propionic acid and an unsaturated ketone of the formula

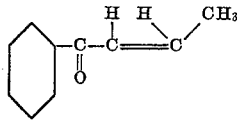

are obtained in good yield.

5 moles of catalyst for each mole of said beta-lactone, heating the resulting mixture to reflux temperature, adding to said mixture a strong acid, thereby to produce a reaction mixture containing a compound of the structure

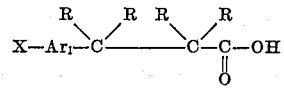

and a compound of the structure

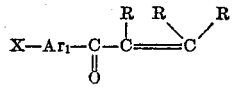

wherein Ar₁ is an arylene radical and R and X have the same significance as above, and recovering said compounds from the reaction mixture.

2. The method of claim 1 wherein the beta-lactone is beta-propiolactone.

3. The method which comprises first admixing a Friedel-Crafts catalyst and an aryl hydrocarbon, maintaining the resulting mixture at a temperature below about 10° C., adding to said mixture a saturated aliphatic beta-lactone of the structure

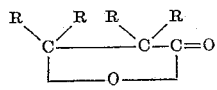

wherein each R is a member of the class consisting of hydrogen and lower alkyl radicals in an amount such that there are present from 2 to 5 moles of catalyst for each mole of said beta-lactone, heating the resulting mixture to reflux temperature, adding to said mixture water and a strong acid, thereby to produce a reaction mixture consisting of a water layer and a water-insoluble layer containing a compound of the structure

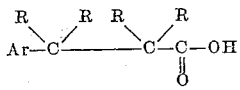

and a compound of the structure

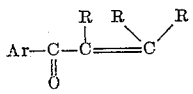

wherein Ar is an aryl radical and R has the same significance as above, separating the water layer from the water-insoluble layer and recovering said compounds by distillation of the water-insoluble layer.

4. The method of claim 3 wherein the beta-lactone is beta-propiolactone and the aryl hydrocarbon is benzene, the products obtained being hydrocinnamic acid and vinyl phenyl ketone.

5. The method which comprises first admixing a Friedel-Crafts catalyst and a compound of the structure Ar—X wherein Ar is an aryl radical and X is a halogen atom, maintaining the resulting mixture at a temperature below about 10° C., and then adding to said mixture a saturated aliphatic beta-lactone of the structure

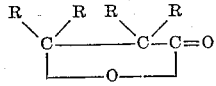

wherein each R is a member of the class consisting of hydrogen and lower alkyl radicals, in an amount such that there are present from 2 to 5 moles of catalyst for each mole of said beta-lactone, heating the resulting mixture to reflux temperature, adding to said mixture water and a strong acid, thereby to produce a reaction mixture consisting of a water layer and a water-insoluble layer containing a compound of the structure

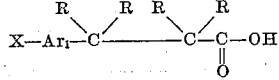

and a compound of the structure

wherein $Ar_1$ is an arylene radical and X and R have the same significance as above, separating the water layer from the water-insoluble layer and recovering said compounds by distillation of the water-insoluble layer.

6. The method of claim 5 wherein the beta-lactone is beta-propiolactone and the compound of the structure Ar—X is chlorobenzene, the products obtained being chlorophenyl propionic acid and vinyl chlorophenyl ketone.

7. The method which comprises first admixing a Friedel-Crafts catalyst and a compound of the structure Ar—X wherein Ar is an aryl radical and X is an alkoxy radical, maintaining the resulting mixture at a temperature below about 10° C., and then adding to said mixture a saturated aliphatic beta-lactone of the structure

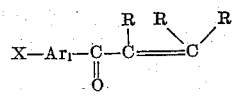

wherein each R is a member of the class consisting of hydrogen and lower alkyl radicals, in an amount such that there are present from 2 to 5 moles of catalyst for each mole of said beta-lactone, heating the resulting mixture to reflux temperature, adding to said mixture water and a strong acid, thereby to produce a reaction mixture consisting of a water layer and a water-insoluble layer containing a compound of the structure

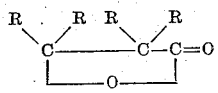

and a compound of the structure

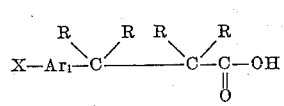

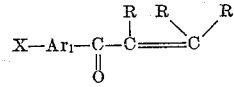

wherein $Ar_1$ is an arylene radical and X and R have the same significance as above, separating the water layer from the water-insoluble layer and recovering said compounds by distillation of the water-insoluble layer.

8. The method of claim 7 wherein the beta-lactone is beta-propiolactone and the compound of the structure Ar—X is methoxybenzene, the products obtained being methoxyphenylpropionic acid and vinyl methoxyphenyl ketone.

FORREST W. SHAVER.

REFERENCES CITED

The following references are of record in the file of this patent:

King, Chem. Abs., vol. 20, p. 751 (1926).
King, J. Am. Chem. Soc., vol. 49, 562–566 (1927).